(12) United States Patent
Horn et al.

(10) Patent No.: US 11,781,029 B2
(45) Date of Patent: Oct. 10, 2023

(54) HEAT-SENSITIVE RECORDING MATERIAL

(71) Applicant: PAPIERFABRIK AUGUST KOEHLER SE, Oberkirch (DE)

(72) Inventors: Michael Horn, Offenburg (DE); Timo Stalling, Appenweier (DE); Kerstin Zieringer, Achern (DE)

(73) Assignee: PAPIERFABRIK AUGUST KOEHLER SE, Oberkirch (DE)

( * ) Notice: Subject to any disclaimer, the term of this patent is extended or adjusted under 35 U.S.C. 154(b) by 552 days.

(21) Appl. No.: 17/053,682

(22) PCT Filed: May 6, 2019

(86) PCT No.: PCT/EP2019/061582
§ 371 (c)(1),
(2) Date: Nov. 6, 2020

(87) PCT Pub. No.: WO2019/215099
PCT Pub. Date: Nov. 14, 2019

(65) Prior Publication Data
US 2021/0071025 A1    Mar. 11, 2021

(30) Foreign Application Priority Data
May 9, 2018    (DE) .................... 10 2018 111 224.6

(51) Int. Cl.
| C09D 11/50 | (2014.01) |
| B41M 5/327 | (2006.01) |
| B41M 5/333 | (2006.01) |
| B41M 5/41 | (2006.01) |
| C09D 11/037 | (2014.01) |
| C09K 9/02 | (2006.01) |
| D21H 19/42 | (2006.01) |
| D21H 27/00 | (2006.01) |

(52) U.S. Cl.
CPC ........... *C09D 11/50* (2013.01); *B41M 5/3275* (2013.01); *B41M 5/3335* (2013.01); *B41M 5/41* (2013.01); *C09D 11/037* (2013.01); *C09K 9/02* (2013.01); *D21H 19/42* (2013.01); *D21H 27/00* (2013.01); *B41M 2205/36* (2013.01); *C09K 2211/1007* (2013.01); *C09K 2211/1011* (2013.01); *C09K 2211/1014* (2013.01); *C09K 2211/1022* (2013.01)

(58) Field of Classification Search
CPC .... C09D 11/50; C09D 11/037; B41M 5/3275; B41M 5/3335; B41M 5/41; B41M 2205/36; C09K 9/02; C09K 2211/1007; C09K 2211/1011; C09K 2211/1014; C09K 2211/1022
USPC ...................................................... 428/32.21
See application file for complete search history.

(56) References Cited

U.S. PATENT DOCUMENTS

| 7,635,662 B2 | 12/2009 | Kabashima et al. |
| 10,160,245 B2 | 12/2018 | Horn |

FOREIGN PATENT DOCUMENTS

| DE | 102014107567 B3 | 11/2015 |
| EP | 0526072 A1 | 7/1992 |
| EP | 0620122 A1 | 4/1994 |
| JP | 5185737 A | 7/1993 |
| JP | 10095171 A | 4/1998 |
| JP | 10217613 A | 8/1998 |
| JP | 11263769 A | 9/1999 |
| WO | 200035679 A1 | 6/2000 |
| WO | 2001066515 A1 | 9/2001 |

OTHER PUBLICATIONS

Heat-Sensitive Recording Material, Shimada et al. JP 10217613 A (Year: 1998).*
International Search Report & Written Opinion for PCT Application No. PCT/EP2019/061582, dated Jul. 17, 2019, 13 pages.
Sah, Peter P. T. et al., "Azaides XXII, Phenyl-, p-tolyl, 1-naphthyl, and 2-naphthylbiurets as characteristic derivatives for the identification of amines", Journal of the Chinese Chemical Society, 1946, pp. 52-64 in Chemical Abstracts No. 1949.

* cited by examiner

*Primary Examiner* — Betelhem Shewareged
(74) *Attorney, Agent, or Firm* — Lippes Mathias LLP

(57) ABSTRACT

The invention relates to a heat-sensitive recording material, comprising a carrier substrate and a heat-sensitive colour-forming layer, which contains at least one colour former and at least one phenol-free colour developer, characterised in that the at least one colour developer is the compound of formula (A), $Ar(NH-CO-NH-CO-NH-Ar^1)_n$ (A), wherein Ar is an unsubstituted or substituted phenyl or naphthyl group, $Ar^1$ is an unsubstituted or substituted phenyl, naphthyl, pyridyl, thiazolyl or benzothiazolyl group, and n is 1 or 2.

20 Claims, No Drawings

HEAT-SENSITIVE RECORDING MATERIAL

The invention relates to a heat-sensitive recording material comprising a carrier substrate and a heat-sensitive colour-forming layer, which contains at least one colour former and at least one phenol-free colour developer, and to the use of the phenol-free colour developer in a heat-sensitive recording material.

Heat-sensitive recording materials (thermal papers) for direct thermal printing applications, which have a heat-sensitive colour-forming layer (thermal reaction layer) applied to a carrier substrate, have been known for a long time.

The heat-sensitive colour-forming layer usually contains a colour former and a colour developer, which react with each other under the influence of heat and thus lead to colour development. Inexpensive phenolic colour developers (bisphenol A, bisphenol S, etc.) are widely used to obtain heat-sensitive recording materials with an acceptable performance profile for numerous applications. Also known are heat-sensitive recording materials that contain a non-phenolic colour developer in the heat-sensitive colour-forming layer.

These have been developed to improve the resistance of the typeface, especially if the printed heat-sensitive recording material is stored for longer periods of time at higher temperatures and/or humidity. Especially against the background of the public discussions regarding the toxic potential of bis-phenolic chemicals, interest in non-phenolic colour developers has risen sharply. The aim here was to avoid the disadvantages of bis-phenolic colour developers, but to at least maintain, and preferably improve, the technical performance properties that can be achieved with phenolic colour developers.

The very extensive prior art on non-phenolic developing agents reveals common structural characteristics despite the great chemical diversity of these substances.

For example, a 1,3-disubstituted (thio)ureido substructure (Y—NH—C(X)—NH—Z with X=S or O) is a common feature of numerous non-phenolic classes of colour developers. The functional properties relevant for suitability as a colour developer can be modulated by appropriate selection of the Y and Z groups.

Colour developers with sulfonylurea structures —(Y=SO$_2$, X=O in the above formula) are widely used because they are relatively easy to produce and the heat-sensitive recording materials they produce have good application properties.

EP 0526072 A1 and EP 0 620 122 B1 describe colour developers from the class of aromatic sulfonyl(thio)ureas. With these, heat-sensitive recording materials can be obtained that are characterised by a relatively high image resistance. Furthermore, the heat-sensitive recording materials based on these colour developers have a useful thermal pressure sensitivity with good surface whiteness, so that, if the formulation of the heat-sensitive colour-forming layer is appropriately designed, it is comparatively easy to produce high print densities using commercially available thermal printers.

WO 0 035 679 A1 discloses aromatic and heteroaromatic sulfonyl(thio)urea compounds (X=S or O) and/or sulfonyl guanidines (X=NH) of the formula Ar$^1$—SO$_2$—NH—C(X)—NH—Ar, wherein Ar is linked to other aromatic groups by a divalent linker group. A non-phenolic colour developer from this class, 4-methyl-N-[[[3-[[[4-methylphenyl]sulfonyl]oxy]phenyl]amino]carbonyl]benzene sulfonamide (trade name Pergafast 201®, BASF), which is widely used in practice, is characterised by the balance of the application properties of the heat-sensitive recording materials produced with this colour developer. Especially, these materials have good dynamic responsiveness and, compared to recording materials obtained with (bis)phenolic colour developers, high resistance of the print when stored under harsh environmental conditions or with respect to hydrophobic substances.

Every new development must be able to compete with the performance spectrum of this established non-phenolic colour developer.

Sulfonylureas tend towards hydrolytic decomposition reactions in the presence of water/moisture and in heat (M. Eckhardt, T. J. Simat, Chemosphere, 186, 1016 (2017)). As a result, heat-sensitive recording materials based on sulfonylurea chemistry may experience partial decomposition of the colour developer when stored in the unprinted state under conditions of elevated humidity and/or temperature. Since the writing performance (dynamic responsiveness) of heat-sensitive recording materials also depends on the amount of colour developer present in the heat-sensitive layer, a heat-sensitive recording material stored for a longer period of time loses part of the colour developer and thus partially loses its writing performance.

The possibility of modulating the properties of the 1,3-disubstituted direct sulfonylurea unit can also be achieved by including groups that are favourably conjugated to the sulfonyl ureido unit.

This approach has been followed, for example, in JP 1 126 37 69 A. This discloses colour developer structures of the general formula (R$^1$—SO$_2$—NH—CO—NH—CO—NH—)$_n$—Y, wherein R$^1$ can be an alkyl or aryl group, n is ≥2, and Y is an organic group (mainly diphenylmethane or phenyl groups) with a valency n≥2.

JP 051 85 737 discloses colour developers of the general formula R$^1$—SO$_2$—NH—C(X)—NH—C(Y)—R$^2$, where R$^1$ is an aromatic group, R$^2$ may be an alkyl or aryl group, and X and Y are oxygen or sulfur.

The aim of the present invention is to overcome the disadvantages of the prior art described above. Especially, the aim of the present invention is to provide a heat-sensitive recording material which has a balanced application property profile and achieves a print density suitable for practical use, comparable to that possible with known non-phenolic colour developing agents, but at the same time ensures a high resistance of the printed image, especially under increased ambient temperature and humidity or under the influence of light, without having to rely on special formulation components in the heat-sensitive colour-forming layer, such as antioxidants or special melting aids with limited availability and high price.

A further aim of the present invention is to provide a heat-sensitive recording material which is able to guarantee the functional properties required for application (especially the thermal responsiveness), even when the unprinted heat-sensitive recording material is stored for longer periods of time and/or under extreme climatic conditions.

In accordance with the invention, this aim is addressed with a heat-sensitive recording material which comprises a carrier substrate and a heat-sensitive colour-forming layer, which contains at least one colour former and at least one phenol-free colour developer, and is characterised in that the at least one colour developer is the compound of formula (A), $$\text{Ar(NH—CO—NH—CO—NH—Ar}^1)_n \quad \quad \text{(A),}$$

wherein Ar is an unsubstituted or substituted phenyl or naphthyl group, $Ar^1$ is an unsubstituted or substituted phenyl, naphthyl, pyridyl, thiazolyl or benzothiazolyl group, and n is 1 or 2.

Surprisingly, it has been shown that, with colour developers of formula (A), which do not contain any sulfonylurea units, it is possible to obtain heat-sensitive recording materials which are characterised by excellent resistance of the typeface, especially at elevated ambient temperature and humidity or when exposed to light over a longer period of time, and with which a good quality of the printed image (high optical density of the printed image) can be achieved. Furthermore, the long-term storage capability of the heat-sensitive recording materials according to the invention is outstanding. When stored in the unprinted state for several weeks at high ambient humidity and/or temperature, the optical density achieved when printing in a thermal printer hardly suffers.

Also, the temperature from which the white heat-sensitive recording material according to the invention with the colour developers of formula (A) turns noticeably grey is significantly higher than that of the comparison papers with known colour developers (desirable high starting temperature).

Preferably, n is 1, since these compounds are especially easily produced.

Preferably, Ar is an unsubstituted or substituted phenyl group.

Especially preferably, Ar is a phenyl group substituted with a $C_1$-$C_4$ alkyl group, an alkenyl group, an alkynyl group, a benzyl group, a halogen group, an $NO_2$ group, a CN group, a formyl group, an ROC group, an RO group, an $RO_2C$ group, an ROCO group, an R—$SO_2$O group, an RO—$SO_2$ group, an RNHCO group, an RCONH group, an R—NH—$SO_2$ group, or an R—$SO_2$—NH group, wherein R is a $C_1$-$C_4$ alkyl group, an alkenyl group, an alkynyl group, a phenyl group, a tolyl group, or a benzyl group. These compounds can be produced especially easily.

Very especially preferably, Ar is a phenyl group substituted with a $C_1$-$C_4$ alkyl group, a halogen group, an $NO_2$ group, an ROC group, an RO group, an $RO_2C$ group or an R—$SO_2$—NH group, wherein R is a $C_1$-$C_4$ alkyl group. These compounds can be produced easily and economically.

Especially, Ar is an unsubstituted phenyl group, a 4-acetyl-phenyl group, a 3-chloro-phenyl group, or a 4-methoxy-phenyl group. These compounds are especially powerful.

Preferably, $Ar^1$ is a phenyl group substituted with a $C_1$-$C_4$ alkyl group, an alkenyl group, an alkynyl group, a benzyl group, a halogen group, an $NO_2$ group, a CN group, a formyl group, an ROC group, an $R^1O$ group, an $R^1O_2C$ group, an $R^1OCO$ group, an $R^1$—$SO_2O$ group, an $R^1O$—$SO_2$ group, an $R^1NHCO$ group, an $R^1CONH$ group, an $R^1$—NH—$SO_2$ group, or an $R^1$—$SO_2$—NH group, wherein $R^1$ is a $C_1$-$C_4$ alkyl group, an alkenyl group, an alkynyl group, a phenyl group, a tolyl group, a benzyl group, a thiazolyl group, a benzothiazolyl group, or a pyrimidyl group. These compounds can be produced easily.

Especially preferably, $Ar^1$ is a phenyl group substituted with a $C_2$-$C_4$ alkyl group, a halogen group, an $R^1OC$ group, an $R^1O$ group, an $R^1O_2Cu$, an $R^2OCO$ group, an $R^1$—$SO_2O$ group, an $R^1$—$SO_2$ group, or an $R^1$—$SO_2$—NH group, wherein $R^1$ is a $C_1$-$C_4$ alkyl group, a phenyl group, a tolyl group, a thiazolyl group, or pyrimidyl group. These compounds can be produced easily and economically.

Very especially preferably, $Ar^1$ is a phenyl group substituted with an $R^1O$—$SO_2$ group or an $R^1$—$SO_2O$ group. These compounds are especially efficient. The phenyl group is preferably substituted in the 3 or 4 position. Such compounds are especially efficient.

Especially preferred compounds of formula (A) are shown in Table 1 below.

TABLE 1

Preferred compounds of formula (A) with the given meanings for Ar, $Ar^1$ and n (R and $R^1$ = as mentioned above)

| Ar | $Ar^1$ | n |
|---|---|---|
| Phenyl- | Phenyl- | 1 |
| Phenyl- | $C_1$—$C_4$-alkyl-substituted phenyl- | 1 |
| Phenyl- | Halogen-substituted phenyl- | 1 |
| Phenyl- | $R^1$O-substituted phenyl- | 1 |
| Phenyl- | $R^1$OC-substituted phenyl- | 1 |
| Phenyl- | $NO_2$-substituted phenyl- | 1 |
| Phenyl- | $R^1O_2C$-substituted phenyl- | 1 |
| Phenyl- | $R^1$OCO-substituted phenyl- | 1 |
| Phenyl- | $R^1$—$OSO_2$-substituted phenyl- | 1 |
| Phenyl- | $R^1$—$SO_2O$-substituted phenyl- | 1 |
| Phenyl- | $R^1$—$SO_2NH$-substituted phenyl- | 1 |
| Phenyl- | Naphthyl- | 1 |
| Phenyl- | Thiazolyl- | 1 |
| Phenyl- | Benzothiazolyl- | 1 |
| Phenyl- | Pyridyl- | 1 |
| ROC-substituted phenyl- | $R^1$OC-substituted phenyl- | 1 |
| ROC-substituted phenyl- | $R^1$—$SO_2O$-substituted phenyl- | 1 |
| ROC-substituted phenyl- | $R^1$—$OSO_2$-substituted phenyl- | 1 |
| ROC-substituted phenyl- | $R^1$—$OSO_2$-substituted phenyl- | 1 |
| Halogen-substituted phenyl- | $R^1$—$OSO_2$-substituted phenyl- | 1 |
| Phenyl- | Phenyl- | 2 |

The compound of formula (A) is preferably present in an amount of from about 3 to about 35% by weight, especially preferably in an amount of from about 1 to about 25% by weight, in relation to the total solids content of the heat-sensitive layer.

The compound of formula (A) can be produced by methods known per se.

Reaction scheme 1 illustrates a possible synthesis pathway for the compound of formula (A) using the example of compounds I-XXIX (see Table 2).

Reaction scheme 1

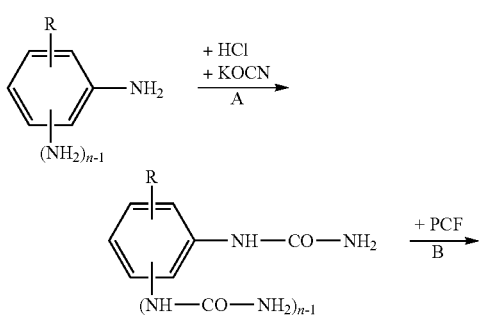

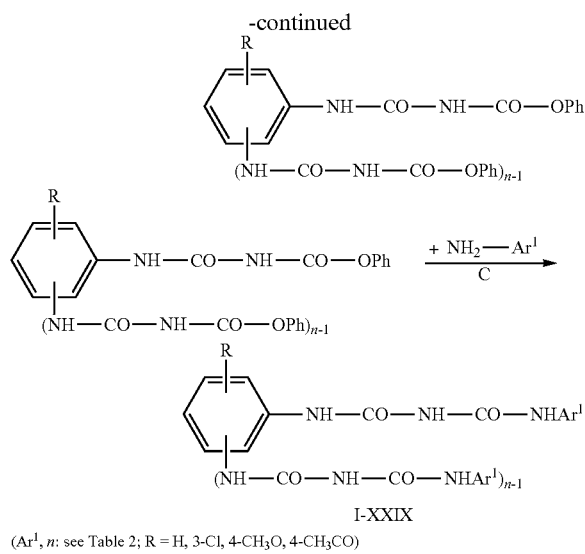

I-XXIX (Ar¹, n: see Table 2; R = H, 3-Cl, 4-CH₃O, 4-CH₃CO)

The selection of the carrier substrate is not critical. However, it is preferable to use paper, synthetic paper and/or a plastics film as the carrier substrate.

If necessary, there is at least one further intermediate layer between the carrier substrate and the heat-sensitive layer, with this intermediate layer having the task of improving the surface smoothness of the carrier for the heat-sensitive layer and providing a thermal barrier between the carrier paper and the heat-sensitive layer. Preferably, organic hollow sphere pigments and/or calcined kaolins are used in this intermediate layer.

In addition, at least one protective layer arranged above the heat-sensitive layer and/or at least one layer promoting printability may be present in the heat-sensitive recording material according to the invention, and these layers may be applied to the front or rear side of the substrate.

With regard to the choice of colour former, the present invention is also not subject to any major restrictions. However, the colour former is preferably a dye of the triphenylmethane type, the fluoran type, the azaphthalide type and/or the fluorene type. A fluoran-type dye is a very especially preferred colour former, since its availability and balanced application properties enable the provision of a heat-sensitive recording material having an attractive price-performance ratio.

Especially preferred fluoran-type dyes are as follows:
3-diethylamino-6-methyl-7-anilinofluoran,
3-(N-ethyl-N-4-toludinamino)-6-methy-7-anilinofluoran,
3-(N-ethyl-N-isoamylamino)-6-methyl-7-anilinofluoran,
3-diethylamino-6-methyl-7-(2,4-dimethylanilino)fluoran,
3-pyrrolidino-6-methyl-7-anilinofluoran,
3-(cyclohexyl-N-methylamino)-6-methyl-7-anilinofluoran,
3-diethylamino-7-(3-trifluoromethylanilino)fluoran,
3-N-n-dibutylamino-6-methyl-7-anilinofluoran,
3-diethylamino-6-methyl-7-(3-methylanilino)fluoran,
3-N-n-dibutylamino-7-(2-chloroanilino)fluoran,
3-(N-ethyl-N-tetrahydrofurfurylamino)-6-methyl-7-anilinofluoran,
3-(N-methyl-N-propylamino)-6-methyl-7-anilinofluoran,
3-(N-ethyl-N-ethoxypropylamino)-6-methyl-7-anilinofluoran,
3-(N-ethyl-N-isobutylamino)-6-methyl-7-anilinofluoran and/or
3-dipentylamino-6-methyl-7-anilinofluoran.

The colour former can be used as a single substance, but also as a mixture of two or more colour formers, provided that the desirable application properties of the recording materials do not suffer as a result.

The colour former is preferably present in an amount of from about 5 to about 30% by weight, Especially preferably in an amount of from about 8 to about 20% by weight, in relation to the total solids content of the heat-sensitive layer.

To control specific application properties, it may be advantageous to have at least two of the compounds falling under the general formula (A) as colour developers in the heat-sensitive colour-forming layer.

Likewise, one or more other (bis)phenolic or non-phenolic colour developer(s) may be present in the heat sensitive colour-forming layer in addition to the compound(s) of formula (A).

In addition to the at least one colour former and the at least one colour developer, the heat-sensitive colour-forming layer may contain one or more sensitising agents, also known as thermal solvents or melting aids, which has the advantage that it is easier to control thermal pressure sensitivity.

In general, crystalline substances with a melting point between about 90 and about 150° C. are advantageously used as sensitising agents, and, in the molten state, dissolve the colour-forming components (colour formers and colour developers) without disturbing the formation of the colour complex.

Preferably, the sensitising agent is a fatty acid amide, such as stearamide, beheneamide or palmitamide, an ethylene-bis-fatty acid amide, such as N,N'-ethylene-bis-stearic acid amide or N,N'-ethylene-bis-oleic acid amide, a fatty acid alkanolamide, such as N-(hydroxymethyl)stearamide, N-hydroxymethylpalmitamide or hydroxyethylstearamide, a wax, such as polyethylene wax or montan wax, a carboxylic acid ester, such as dimethyl terephthalate, dibenzyl terephthalate, benzyl-4-benzyloxybenzoate di-(4-methylbenzyl)oxalate, di-(4-chlorobenzyl)oxalate or di-(4-benzyl)oxalate, a ketone such as 4-acetylbiphenyl, an aromatic ether such as 1,2-diphenoxy-ethane, 1,2-di(3-methylphenoxy) ethane, 2-benzyloxynaphthalene, 1,2-bis(phenoxymethyl)benzene or 1,4-diethoxynaphthalene, an aromatic sulfone, such as diphenylsulfone, and/or an aromatic sulfonamide, such as 4-toluenesulfonamide, benzenesulfonanilide or N-benzyl-4-toluenesulfonamide, or aromatic hydrocarbons, such as 4-benzylbiphenyl The sensitising agent is preferably present in an amount of from about 10 to about 40% by weight, especially preferably in an amount of from about 15 to about 25% by weight, in relation to the total solids content of the heat-sensitive layer.

In addition to the colour former, the phenol-free colour developer and, as applicable, the sensitising agent, in a further preferred embodiment at least one stabiliser (antioxidant) is present in the heat-sensitive colour-forming layer.

The stabiliser is preferably constituted by sterically hindered phenols, especially preferably 1,1,3-tris-(2-methyl-4-hydroxy-5-cyclohexyl-phenyl)-butane, 1,1,3-tris-(2-methyl-4-hydroxy-5-tert-butylphenyl)-butane, 1,1-bis-(2-methyl-4-hydroxy-5-tert-butyl-phenyl)-butane.

Also urea-urethane compounds (for example commercial product UU) or ethers derived from 4,4'-dihydroxydiphenylsulfone, such as 4-benzyloxy-4'-(2-methylglycidyloxy)-diphenylsulfone (trade name NTZ-95®, Nippon Soda Co. Ltd.), or oligomeric ethers (trade name D90®, Nippon Soda Co. Ltd.) can be used as stabilisers in the recording material according to the invention.

The stabiliser is preferably present in an amount of about 0.2 to 0.5 parts by weight, in relation to the at least one phenol-free colour developer of the compound of formula (A).

In a further preferred embodiment, the heat-sensitive colour-forming layer contains at least one binder. These are preferably water-soluble starches, starch derivatives, starch-based biolatices of the EcoSphere® type, methyl cellulose, hydroxyethyl cellulose, carboxymethyl celluloses, partially or completely saponified polyvinyl alcohols, chemically modified polyvinyl alcohols, or styrene-maleic anhydride copolymers, styrene-butadiene copolymers, acrylamide-(meth)acrylate copolymers, acrylamide-acrylate-methacrylate terpolymers, polyacrylates, poly(meth)acrylic acid esters, acrylate-butadiene copolymers, polyvinyl acetates and/or acrylonitrile-butadiene copolymers.

The binder is preferably present in an amount of from about 5 to 40% by weight, especially preferably in an amount of from about 8 to 25% by weight, in relation to the total solids content of the heat-sensitive layer.

In a further preferred embodiment, at least one release agent (anti-stick agent) or lubricant is present in the heat-sensitive colour-forming layer. These agents are preferably fatty acid metal salts, such as zinc stearate or calcium stearate, or behenate salts, synthetic waxes, for example in the form of fatty acid amides, such as stearic acid amide and behenic acid amide, fatty acid alkanol amides, such as stearic acid methylolamide, paraffin waxes of different melting points, ester waxes of different molecular weights, ethylene waxes and propylene waxes of different hardnesses and/or natural waxes, such as carnauba wax or montan wax.

The release agent is preferably present in an amount of from about 1 to about 10% by weight, Especially preferably in an amount of from about 3 to about 6% by weight, in relation to the total solids content of the heat-sensitive layer.

In a further preferred embodiment, the heat-sensitive colour-forming layer contains pigments. One of the advantages of using these pigments is that they can fix on their surface the molten chemicals produced in the thermal printing process. Pigments can also be used to control the surface whiteness and opacity of the heat-sensitive colour-forming layer and its printability with conventional inks. Lastly, pigments have an "extender function", for example for the relatively expensive colouring functional chemicals.

Especially suitable pigments are inorganic pigments, both synthetic and natural, preferably clays, precipitated or natural calcium carbonates, aluminium oxides, aluminium hydroxides, silicas, precipitated and pyrogenic silicas (for example Aerodisp® types), diatomaceous earths, magnesium carbonates, talc, but also organic pigments, such as hollow pigments with a styrene/acrylate copolymer wall or urea/formaldehyde condensation polymers. These can be used alone or in any mixture.

The pigments are preferably present in an amount of from about 20 to about 50% by weight, especially preferably in an amount of from about 30 to about 40% by weight, in relation to the total solids content of the heat-sensitive layer.

To control the surface whiteness of the heat-sensitive recording material according to the invention, optical brighteners can be incorporated into the heat-sensitive colour-forming layer. These are preferably stilbenes.

In order to improve certain coating properties, it is preferable in individual cases to add further components, Especially rheological auxiliaries such as thickeners and/or surfactants, to the mandatory components of the heat-sensitive recording material according to the invention.

The applied weight per unit area of the (dry) heat-sensitive layer is preferably about 1 to about 10 $g/m^2$, preferably about 3 to about 6 $g/m^2$.

In an especially preferred embodiment, the heat-sensitive recording material, in which a dye of the fluoran type is used as colour former and a sensitising agent, a lubricant, a pigment and/or a binder is additionally present. A sensitising agent, a lubricant, a pigment and a binder are preferably present together.

The heat-sensitive recording material according to the invention can be obtained using known production methods.

However, it is preferable to obtain the recording material according to the invention by a method in which an aqueous suspension containing the starting materials of the heat-sensitive colour-forming layer is applied to a carrier substrate and dried, the aqueous application suspension having a solids content of from about 20 to about 75V by weight, preferably of from about 30 to about 50% by weight, and is applied and dried by the curtain coating process at an operating speed of the coating plant of at least about 400 m/min.

This process is especially advantageous from an economic point of view.

If the solids content falls below the value of about 20% by weight, the economic efficiency is reduced because a large amount of water must be removed from the coating by gentle drying in a short time, which has a negative effect on the coating speed. If, on the other hand, the value of 75% by weight is exceeded, then this only leads to an increased technical effort to ensure the stability of the coating colour curtain during the coating process.

In the curtain coating process, a free-falling curtain of a coating dispersion is formed. By free fall, the coating dispersion, which is in the form of a thin film (curtain), is "poured" onto a substrate to apply the coating dispersion to the substrate. Document DE 10196052 T1 discloses the use of the curtain coating process in the production of information recording materials, including heat-sensitive recording materials, wherein multilayer recording layers are realised by applying the curtain, which consists of several coating dispersion films, to substrates (speed maximum 200 m/min).

Setting the operating speed of the coating plant to at least about 400 m/min has both economic and technical advantages. Preferably, the operating speed is at least about 750 m/min, especially preferably at least about 1000 m/min, and very especially preferably at least about 1500 m/min. It was especially surprising that, even at the latter speed, the heat-sensitive recording material obtained is not affected in any way, and the operation runs optimally even at this high speed.

In a preferred embodiment of the method according to the invention, the aqueous deaerated coating suspension has a viscosity of about 150 to about 800 mPas (Brookfield, 100 rpm, 20° C.). If the viscosity falls below the value of about 150 mPas or exceeds the value of about 800 mPas, this leads to poor runnability of the coating mass at the coating unit. The viscosity of the aqueous deaerated coating suspension is especially preferably about 200 to about 500 mPas.

In a preferred embodiment, the surface tension of the aqueous application suspension can be adjusted to about 25 to about 60 mN/m, preferably to about 35 to about 50 mN/m (measured according to the static ring method according to Du Noüy, DIN 53914), in order to optimise the process.

The heat sensitive colour-forming layer can be formed on-line or in a separate coating process off-line. This also applies to any subsequently applied layers or intermediate layers.

The method described above is advantageous from an economic point of view and allows a high process performance of the coating plant even at a speed of more than 1500 m/min without any impairment of the process product, that is to say the heat-sensitive recording material according to the invention. The method can be carried out on-line and off-line, which results in a desirable flexibility.

The preferred embodiments listed in connection with the compound of formula (A) also apply to the heat-sensitive recording material according to the invention.

The present invention also relates to a heat-sensitive recording material obtainable by the above-mentioned method.

It is advantageous, especially in the case of paper carrier substrates, if the dried heat-sensitive colour-forming layer is subjected to a smoothing treatment. It is advantageous here to adjust the Bekk smoothness, measured according to ISO 5627, to about 100 to about 1000 sec., preferably to about 250 to about 600 sec.

The surface roughness (PPS) according to ISO 8791-4 is in the range of about 0.50 to about 2.50 μm, preferably in the range of 1.00-2.00 μm.

The heat-sensitive recording material according to the invention is phenol-free and well suited for POS (point-of-sale), label and/or ticket applications. It is also suitable for the production of parking tickets, travel tickets, admission tickets, lottery and betting tickets etc., which can be printed using the direct thermal process and require high resistance of the images recorded on them under long-term storage, even under harsh climatic conditions with regard to temperature and ambient humidity.

Surprisingly, it has been shown that the heat-sensitive recording materials obtained with the colour developers of formula (A) practically do not lose their ability to produce high image densities, even after weeks of storage of the unprinted materials in high ambient humidity and/or at high temperature (good storage capability).

The invention also relates to the use of the compound of formula (A) as a non-phenolic colour developer in a heat-sensitive recording material.

The invention is explained in detail below on the basis of non-limiting examples.

EXAMPLES

The compounds I-XXIX (Table 2) were produced as described below:

TABLE 2

Composition of selected compounds of formula (A)

| | Ar | Ar$^1$ | n |
|---|---|---|---|
| I | $C_6H_5$ | $C_6H_5$ | 1 |
| II | $C_6H_5$ | 4-$CH_3$—$C_6H_4$ | 1 |
| III | $C_6H_5$ | 2-Cl—$C_6H_4$ | 1 |
| IV | $C_6H_5$ | 3-Cl—$C_6H_4$ | 1 |
| V | $C_6H_5$ | 4-Cl—$C_6H_4$ | 1 |
| VI | $C_6H_5$ | 4-$CH_3O$—$C_6H_4$ | 1 |
| VII | $C_6H_5$ | 4-$CH_3CO$—$C_6H_4$ | 1 |
| VIII | $C_6H_5$ | 4-$NO_2$—$C_6H_4$ | 1 |
| IX | $C_6H_5$ | 4-($CO_2CH_3$)—$C_6H_4$ | 1 |
| X | $C_6H_5$ | 2-($CO_2C_2H_5$)—$C_6H_4$ | 1 |
| XI | $C_6H_5$ | 4-($CO_2C_6H_5$)—$C_6H_4$ | 1 |
| XII | $C_6H_5$ | 3-($OCOC_6H_5$)—$C_6H_4$ | 1 |
| XIII | $C_6H_5$ | 3-[$OSO_2$—(4-$CH_3$—$C_6H_4$)]—$C_6H_4$ | 1 |
| XIV | $C_6H_5$ | 4-[$OSO_2$—(4-$CH_3$—$C_6H_4$)]—$C_6H_4$ | 1 |
| XV | $C_6H_5$ | 3-[$SO_2O$—(4-$CH_3$—$C_6H_4$)]—$C_6H_4$ | 1 |
| XVI | $C_6H_5$ | 4-[$SO_2O$—(4-$CH_3$—$C_6H_4$)]—$C_6H_4$ | 1 |
| XVII | $C_6H_5$ | 4-[$SO_2NH$—(2-thiazolyl)]—$C_6H_4$ | 1 |
| XVIII | $C_6H_5$ | 4-[$SO_2NH$-2-(4-$CH_3$-pyrimidyl)]—$C_6H_4$ | 1 |
| XIX | $C_6H_5$ | 1-naphthyl | 1 |
| XX | $C_6H_5$ | 2-thiazolyl | 1 |
| XXI | $C_6H_5$ | 2-benzothiazolyl | 1 |
| XXII | $C_6H_5$ | 2-pyridyl | 1 |
| XXIII | $C_6H_5$ | 4-pyridyl | 1 |
| XXIV | 4-$CH_3CO$—$C_6H_4$ | 4-$CH_3CO$—$C_6H_4$ | 1 |
| XXV | 4-$CH_3CO$—$C_6H_4$ | 3-[$OSO_2$—(4-$CH_3$—$C_6H_4$)]—$C_6H_4$ | 1 |
| XXVI | 4-$CH_3CO$—$C_6H_4$ | 4-[$SO_2O$—(4-$CH_3$—$C_6H_4$)]—$C_6H_4$ | 1 |
| XXVII | 4-$CH_3CO$—$C_6H_4$ | 4-[$SO_2O$—(4-$CH_3$—$C_6H_4$)]—$C_6H_4$ | 1 |
| XXVIII | 3-Cl—$C_6H_4$ | 4-[$SO_2O$—(4-$CH_3$—$C_6H4$)]—$C_6H_4$ | 1 |
| XXIX | 1,4-$C_6H_4$ | $C_6H_5$ | 2 |

Stage A—production of urea (based on R. C. Moschel, W. R. Hudgins, A. Dipple, J. Org. Chem., 51 (22), 4180 (1986)):

A solution of 15 mmol potassium cyanate in 10 mL water is added to a solution of 10 mmol amine and 10 mmol hydrochloric acid (25%) in 30 mL water. The solution is stirred for 18 h at room temperature. The precipitated urea is filtered off, washed with 30 mL water, and recrystallised from dichloromethane or ethyl acetate.

Stage B—production of the allophanates (based on M. M. Al Sabbagh, M. Calmon, J. P. Calmon, Bull. Soc. Chim. Fr., 3-4 (Pt. 2), 73 (1983)):

A solution of 66 mmol phenylchloroformate in 20 mL dichloromethane is added dropwise at room temperature with stirring to a solution of 66 mmol of the corresponding urea and 73 mmol of pyridine in 80 mL dichloromethane. The reaction solution is stirred for 18 hours at room temperature and then mixed with 100 mL water. The phases are separated. The organic phase is washed with 100 mL water. This process is repeated before, after extracting the combined aqueous phases twice with 100 mL dichloromethane, the combined organic phases are dried over magnesium sulfate. After removing the solvent in a vacuum, the purification is carried out by recrystallisation from dichloromethane and a few drops of n-hexane.

Stage C—production of the biuret (based on F. H. S. Curd, D. G. Davey, D. N. Richardson, J. Chem. Soc., 1732 (1949)):

A solution of 10 mmol of the corresponding amine in 60 mL dichloromethane is added dropwise at room temperature with stirring to a solution of 10 mmol of the corresponding allophanate and 10 mmol potassium carbonate in 240 mL dichloromethane. The reaction mixture is refluxed for 18 hours and then mixed with 300 mL water. The aqueous phase is separated. The organic phase is again mixed with 300 mL water and the aqueous phase is neutralised by adding 25% hydrochloric acid. The phases are separated. After extraction of the aqueous phase with 300 mL dichloromethane, the combined organic phases are washed with 300 mL water and dried over magnesium sulfate. After removing the solvent in a vacuum, the purification is carried out by recrystallisation from dichloromethane and a few drops of n-hexane.

The starting compounds are either commercially available or were produced according to provisions known from the literature.

Analytical Data:

I, $C_{14}H_{13}N_3O_2$, M=255.3, 1-phenyl-3-(phenyl carbamoyl)urea

MS (ESI): m/z (%)=256.1 (90) $[M+H]^+$, 137.1 (100) $[M+H-Ar^1NCO]^+$. $^1$H-NMR (500 MHz, DMSO-$d_6$): δ (ppm)=9.71 (2H, s), 9.07 (1H, s), 7.51-7.49 (4H, m), 7.35-7.32 (4H, m), 7.09-7.06 (2H, m).

$^{13}$C-NMR (126 MHz, DMSO-$d_6$): δ (ppm)=151.95 (NH$\underline{C}$ONH), 137.82, 128.87, 123.29, 119.27.

II, $C_{15}H_{15}N_3O_2$, M=269.3, 1-(4-methylphenyl)-3-(phenylcarbamoyl)urea

MS (ESI): m/z (%)=270.1 (100) $[M+H]^+$.

$^1$H-NMR (500 MHz, DMSO-$d_6$): δ (ppm)=9.76 (1H, s), 9.64 (1H, s), 9.06 (1H, s), 1.50-7.48 (2H, m), 7.38-7.36 (2H, m), 7.34-7.31 (2H, m), 7.14-7.12 (2H, m), 7.08-7.05 (1H, m), 2.26 (3H, s).

$^{13}$C-NMR (126 MHz, DMSO-$d_6$): δ (ppm)=151.99 (NH$\underline{C}$ONH), 151.97 (NH$\underline{C}$ONH), 137.90, 135.28, 132.32, 129.30, 128.91, 123.28, 119.32, 119.24, 20.33 ($\underline{C}$H$_3$).

III, $C_{14}H_{12}ClN_3O_2$, M=289.7, 1-(2-chlorophenyl)-3-(phenylcarbamoyl)urea MS (ESI): m/z (%)=290.1 (98) $[M+H]^+$.

$^1$H-NMR (500 MHz, DMSO-$d_6$): δ (ppm)=10.44 (1H, s), 9.42 (1H, s), 9.40 (1H, s), 8.22 (1H, dd, J=8.3, 1.5 Hz), 7.50 (1H, dd, J=8.0, 1.5 Hz), 7.48-7.46 (2H, m), 7.36-7.32 (3H, m), 7.12-7.07 (2H, m).

$^{13}$C-NMR (126 MHz, DMSO-$d_6$): δ (ppm)=152.50 (NH$\underline{C}$ONH), 151.37 (NH$\underline{C}$ONH), 137.71, 134.81, 129.22, 128.93, 127.68, 124.35, 123.43, 122.46, 121.45, 119.33.

IV, $C_{14}H_{12}ClN_3O_2$, M=289.7, 1-(3-chlorophenyl)-3-(phenylcarbamoyl)urea

MS (ESI): m/z (%)=290.1 (100) $[M+H]^+$.

$^1$H-NMR (500 MHz, DMSO-$d_6$): δ (ppm)=9.88 (1H, s), 9.63 (1H, s), 9.16 (1H, s), 7.75-7.75 (1H, m), 7.50-7.48 (2H, m), 7.36-7.31 (4H, m), 7.13-7.11 (1H, m), 7.09-7.06 (1H, m).

$^{13}$C-NMR (126 MHz, DMSO-$d_6$): δ (ppm)=151.91 (NH$\underline{C}$ONH), 151.84 (NH$\underline{C}$ONH), 139.38, 137.76, 133.28, 130.47, 128.90, 123.39, 122.99, 119.32, 118.77, 117.78.

V, $C_{14}H_{12}ClN_3O_2$, M=289.7, 1-(4-chlorophenyl)-3-(phenylcarbamoyl)urea

MS (ESI): m/z (%)=290.0 (100) $[M+H]^+$.

$^1$H-NMR (500 MHz, DMSO-$d_6$): δ (ppm)=9.81 (1H, s), 9.65 (1H, s), 9.11 (1H, s), 7.53-7.52 (2H, m), 7.49-7.47 (2H, m), 7.38-7.36 (2H, m), 7.34-7.31 (2H, m), 7.09-7.06 (1H, m).

$^{13}$C-NMR (126 MHz, DMSO-$d_6$): δ (ppm)=151.88 (NH$\underline{C}$ONH), 151.85 (NH$\underline{C}$ONH), 137.75, 136.81, 128.86, 128.70, 126.97, 123.33, 120.87, 119.28.

VII, $C_{16}H_{15}N_3O_3$, M=285.3, 1-(4-methoxyphenyl)-3-(phenylcarbamoyl)urea

MS (ESI): m/z (%)=284.1 (100) $[M–H]^-$.

$^1$H-NMR (500 MHz, DMSO-$d_6$): δ (ppm)=9.73 (1H, s), 9.51 (1H, s), 9.00 (1H, s), 7.49-7.48 (2H, m), 7.40-7.38 (2H, m), 7.34-7.31 (2H, m), 7.08-7.05 (1H, m), 6.91-6.90 (2H, m), 3.73 (3H, s).

$^{13}$C-NMR (126 MHz, DMSO-$d_6$): δ (ppm)=155.47, 152.05 (NH$\underline{C}$ONH), 152.00 (NH$\underline{C}$ONH), 137.90, 130.73, 128.89, 123.24, 121.17, 119.22, 114.07, 55.17 (O$\underline{C}$H3).

VII, $C_{16}H_{15}N_3O_3$, M=297.3, 1-(4-acetylphenyl)-3-(phenylcarbamoyl) urea

MS (ESI): m/z (%)=298.1 (100) $[M+H]^+$.

$^1$H-NMR (500 MHz, DMSO-$d_6$): δ (ppm)=10.05 (1H, 9), 9.63 (1H, s), 9.18 (1H, s), 7.94-7.92 (2H, m), 7.63-7.61 (2H, m), 7.50-7.48 (2H, m), 7.35-7.32 (2H, m), 7.09-7.06 (1H, m), 2.52 (3H, s).

$^{13}$C-NMR (126 MHz, DMSO-$d_6$): δ (ppm)=196.29 ($\underline{C}$OCH$_3$), 151.81 (NH$\underline{C}$ONH), 151.76 (NH$\underline{C}$ONH), 142.29, 137.70, 131.75, 129.51, 128.87, 123.41, 119.34, 118.34, 26.29 ($\underline{C}$H$_3$).

VIII, $C_{14}H_{12}N_4O_4$, M=300.3, 1-(4-nitrophenyl)-3-(phenylcarbamoyl)urea

MS (ESI): m/z (%)=301.0 (100) $[M+H]^+$.

$^1$H-NMR (500 MHz, DMSO-$d_6$): δ (ppm)=10.37 (1H, s), 9.65 (1H, s), 9.33 (1H, s), 8.20-8.18 (2H, m), 7.74-7.72 (2H, m), 7.49-7.47 (2H, m), 7.34-7.31 (2H, m), 7.09-7.06 (1H, m).

$^{13}$C-NMR (126 MHz, DMSO-$d_6$): δ (ppm)=151.76 (NH$\underline{C}$ONH), 151.70 (NH$\underline{C}$ONH), 144.31, 142.19, 137.65, 128.89, 124.95, 123.48, 119.36, 118.76.

IX, $C_{16}H_{16}N_3O_4$, M=313.3, methyl 4-[(phenylcarbamoyl)ureido]benzoate

MS (ESI): m/z (%)=314.1 (100) $[M+H]^+$.

$^1$H-NMR (500 MHz, DMSO-$d_6$): δ (ppm)=10.24 (1H, s), 9.82 (1H, s), 9.33 (1H, s), 7.93-7.91 (2H, m), 7.64-7.62 (2H, m), 7.50-7.49 (2H, m), 7.34-7.31 (2H, m), 7.09-7.06 (1H, m), 3.81 (3H, s).

$^{13}$C-NMR (126 MHz, DMSO-$d_6$): δ (ppm)=165.72 ($\underline{C}$OO), 151.88 (NH$\underline{C}$ONH), 151.82 (NH$\underline{C}$ONH), 142.48, 137.79, 130.39, 128.90, 123.94, 123.38, 119.29, 118.43, 51.83 ($\underline{C}$H$_3$).

X, $C_{17}H_{17}N_3O_4$, M=327.3, ethyl 2-[(phenylcarbamoyl)ureido]benzoate

MS (ESI): m/z (%)=328.1 (23) $[M+H]^+$, 350.0 (100) $[M+Na]^+$.

$^1$H-NMR (500 MHz, DMSO-$d_6$): δ (ppm)=11.21 (1H, s), 9.49 (1H, s), 9.38 (1H, s), 8.30-8.28 (1H, m), 7.94-7.93 (1H, m), 7.60-7.57 (1H, m), 7.49-7.47 (2H, m), 7.35-7.32 (2H, m), 7.19-7.16 (1H, m), 7.09-7.06 (1H, m), 4.36 (2H, d, J=7.1 Hz), 1.35 (3H, d, J=7.1 Hz).

$^{13}$C-NMR (126 MHz, DMSO-$d_6$): δ (ppm)=166.05 ($\underline{C}$OO), 151.82 (NH$\underline{C}$ONH), 151.69 (NH$\underline{C}$ONH), 139.01, 137.94, 133.35, 130.50, 128.84, 123.17, 122.75, 121.89, 119.10, 118.24, 61.01 ($\underline{C}$H$_2$), 13.93 ($\underline{C}$H$_3$).

XI, $C_{21}H_{17}N_3O_4$, M=375.4, phenyl 4-[(phenylcarbamoyl)ureido]benzoate

MS (ESI): m/z (%)=374.0 (100) $[M–H]^-$.

$^1$H-NMR (500 MHz, DMSO-$d_6$): δ (ppm)=10.14 (1H, s), 9.64 (1H, s), 9.23 (1H, s), 8.11-8.10 (2H, m), 7.73-7.71 (2H, m), 7.52-7.50 (2H, m), 7.48-7.45 (2H, m), 7.36-7.33 (2H, m), 7.32-7.29 (1H, m), 7.28-7.26 (2H, m), 7.10-7.07 (1H, m).

$^{13}$C-NMR (126 MHz, DMSO-d$_6$): δ (ppm)=164.00 (COO), 151.78 (NHCONH), 150.65, 143.05, 137.68, 131.09, 129.42, 128.88, 125.77, 123.43, 123.15, 121.84, 119.35, 118.58.

XII, C$_{21}$H$_{17}$N$_3$O$_4$, M=375.4, 3-[(phenylcarbamoyl)ureido]phenyl benzoate MS (ESI): m/z (%)=374.1 (100) [M–H]$^-$.

$^1$H-NMR (500 MHz, DMSO-d$_6$): δ (ppm)=9.91 (1H, s), 9.70 (1H, s), 9.19 (1H, s), 8.15-8.14 (2H, m), 7.76-7.73 (1H, m), 7.62-7.59 (3H, m), 7.51-7.49 (2H, m), 7.43-7.40 (1H, m), 7.35-7.31 (3H, m), 7.08-7.06 (1H, m), 7.02-7.00 (1H, m).

$^{13}$C-NMR (126 MHz, DMSO-d$_6$): δ (ppm)=164.41 (COO), 151.96 (NHCONH), 151.88 (NHCONH), 150.92, 139.03, 137.79, 133.94, 129.71, 128.87, 128.85, 123.32, 119.29, 116.67, 116.59, 112.70.

III, C$_{21}$H$_{19}$N$_3$O$_5$S, M=425.5, 3-[(phenylcarbamoyl)ureido]phenyl 4-tolylsulfonate MS (ESI): m/z (%)=424.0 (100) [M–H]$^-$.

$^1$H-NMR (500 MHz, DMSO-d$_6$): δ (ppm)=9.87 (1H, s), 9.62 (1H, s), 9.11 (1H, s), 7.77-7.75 (2H, m), 7.49-7.46 (4H, m), 7.43-7.43 (1H, m), 7.35-7.29 (4H, m), 7.09-7.06 (1H, m), 6.69-6.67 (1H, m), 2.41 (3H, s).

$^{13}$C-NMR (126 MHz, DMSO-d$_6$): δ (ppm)=151.78 (NHCONH), 151.77 (NHCONH), 149.27, 145.69, 139.26, 137.70, 131.48, 130.13, 130.08, 128.87, 128.11, 123.39, 119.32, 117.81, 116.31, 112.64, 21.09 (CH$_3$).

XIV, C$_{21}$H$_{19}$N$_3$O$_5$S, M=425.5, 4-[(phenylcarbamoyl)ureido]phenyl 4-tolylsulfonate MS (ESI): m/z (%)=424.1 (100) [M–H]$^-$.

$^1$H-NMR (500 MHz, DMSO-d$_6$): δ (ppm)=9.80 (1H, s), 9.63 (1H, s), 9.10 (1H, s), 7.73-7.72 (2H, m), 7.48-7.45 (6H, m), 7.34-7.31 (2H, m), 7.08-7.05 (1H, m), 6.99-6.97 (2H, m), 2.41 (3H, s).

$^{13}$C-NMR (126 MHz, DMSO-d$_6$): δ (ppm)=151.88 (NHCONH), 151.83 (NHCONH), 145.62, 144.30, 137.73, 136.86, 131.37, 130.10, 128.86, 128.15, 123.34, 122.52, 120.35, 119.26, 21.08 (CH$_3$).

XV, C$_{21}$H$_{19}$N$_3$O$_5$S, M=425.5, 4-tolyl 3-[(phenylcarbamoyl)ureido]phenylsulfonate MS (ESI): m/z (%)=424.0 (100) [M–H]$^-$.

$^1$H-NMR (500 MHz, DMSO-d$_6$): δ (ppm)=10.09 (1H, s), 9.59 (1H, s), 9.23 (1H, s), 8.26-8.25 (1H, m), 7.74-7.72 (1H, m), 7.60-7.57 (1H, m), 7.51-7.49 (3H, m), 7.35-7.31 (2H, m), 7.18-7.16 (2H, m), 7.10-7.06 (1H, m), 6.94-6.91 (2H, m), 2.26 (3H, s).

$^{13}$C-NMR (126 MHz, DMSO-d$_6$): δ (ppm)=151.97 (NHCONH), 151.73 (NHCONH), 146.85, 139.09, 137.69, 136.90, 135.12, 130.27, 130.24, 128.85, 125.10, 123.42, 122.61, 121.62, 119.37, 117.87, 20.25 (CH$_3$).

XVI, C$_{21}$H$_{19}$N$_3$O$_5$S, M=425.5, 4-tolyl 4-[(phenylcarbamoyl)ureido]phenylsulfonate MS (ESI): m/z (%)=424.0 (100) [M–H]$^-$.

$^1$H-NMR (500 MHz, DMSO-d$_6$): δ (ppm)=10.23 (1H, s), 9.60 (1H, s), 9.28 (1H, s), 7.79-7.74 (4H, m), 7.50-7.49 (2H, m), 7.35-7.32 (2H, m), 7.16-7.15 (2H, m), 7.10-7.07 (1H, m), 6.90-6.89 (2H, m), 2.25 (3H, s).

$^{13}$C-NMR (126 MHz, DMSO-d$_6$): δ (ppm)=151.79 (NHCONH), 151.70 (NHCONH), 146.91, 143.68, 137.62, 136.74, 130.21, 129.66, 128.88, 127.74, 123.48, 121.70, 119.37, 118.97, 20.25 (CH$_3$).

XVII, C$_{17}$H$_{15}$N$_5$O$_4$S$_2$, M=417.5, 1-(4-sulfathiazolylphenyl)-3-(phenyl-carbamoyl)urea MS (ESI): m/z (%)=416.0 (100) [M–H]$^-$.

$^1$H-NMR (500 MHz, DMSO-d$_6$): δ (ppm)=10.06 (1H, s), 9.76 (1H, s), 9.48 (1H, s), 7.77-7.75 (2H, m), 7.62-7.60 (2H, m), 7.51-7.49 (2H, m), 7.34-7.31 (2H, m), 7.16 (1H, d, J=4.3 Hz), 7.08-7.06 (1H, m), 6.70 (1H, d, J=4.3 Hz).

$^{13}$C-NMR (126 MHz, DMSO-d$_6$): δ (ppm)=169.08, 151.97 (NHCONH), 151.91 (NHCONH), 140.61, 137.81, 137.77, 128.90, 128.90, 127.08, 123.40, 119.42, 118.65, 107.86.

XVIII, C$_{19}$H$_{18}$N$_6$O$_4$S, M=426.4, (2-(4-methyl-pyrimidyl)) 4-[(phenyl-carbamoyl)ureido]phenylsulfonamide MS (ESI): m/z (%)=425.0 (100) [M–H]$^-$.

$^1$H-NMR (500 MHz, DMSO-d$_6$): δ (ppm)=10.41 (1H, s), 10.00 (1H, bs), 9.94 (1H, s), 9.44 (1H, s), 8.32 (1H, d, J=5.1 Hz), 7.97-7.95 (2H, m), 7.68-7.67 (2H, m), 7.49-7.48 (2H, m), 7.33-7.30 (2H, m), 7.08-7.05 (1H, m), 6.89 (1H, d, J=5.1 Hz), 2.31 (3H, s).

$^{13}$C-NMR (126 MHz, DMSO-d$_6$): δ (ppm)=168.20, 157.42, 156.51, 151.94 (NHCONH), 151.83 (NHCONH), 141.95, 137.80, 134.32, 129.18, 128.89, 123.37, 119.28, 118.24, 114.77, 23.21 (CH$_3$).

XIX, C$_{18}$H$_{15}$N$_3$O$_2$, M=305.3, 1-(1-naphthyl)-3-(phenylcarbamoyl)urea MS (ESI): m/z (%)=304.1 (100) [M–H]$^-$.

$^1$H-NMR (500 MHz, DMSO-d$_6$): δ (ppm)=9.84 (3H, bs), 8.09-8.05 (2H, m), 7.97-7.95 (1H, m), 7.73-7.71 (1H, m), 7.65-7.62 (1H, m), 7.58-7.50 (4H, m), 7.37-7.34 (2H, m), 7.11-7.08 (1H, m).

$^{13}$C-NMR (126 MHz, DMSO-d$_6$): δ (ppm)=152.77 (NHCONH), 152.42 (NHCONH), 137.87, 133.60, 132.76, 128.87, 128.46, 126.29, 126.01, 125.84, 125.69, 124.04, 123.29, 120.65, 119.35, 118.06.

XX, C$_{11}$H$_{10}$N$_4$O$_2$S, M=262.3, 1-(2-thiazolyl)-3-(phenylcarbamoyl)urea MS (ESI): m/z (%)=263.0 (44) [M+H]$^+$, 170.0 (100) [M–ArNH3]$^+$.

$^1$H-NMR (500 MHz, DMSO-d$_6$): δ (ppm)=11.32 (1H, s), 9.62 (1H, s), 9.43 (1H, s), 7.51-7.49 (2H, m), 7.45-7.44 (1H, m), 7.35-7.32 (2H, m), 7.22-7.21 (1H, m), 7.11-7.08 (1H, m).

$^{13}$C-NMR (126 MHz, DMSO-d$_6$): δ (ppm)=158.42, 151.80 (NHCONH), 151.49 (NHCONH), 137.51, 136.99, 128.86, 123.55, 119.49, 113.57.

XXI, C$_{15}$H$_{12}$N$_4$O$_2$S, M=312.3, 1-(2-benzothiazolyl)-3-(phenylcarbamoyl)urea MS (ESI): m/z (%)=313.0 (100) [M+H]$^+$.

$^1$H-NMR (500 MHz, DMSO-d$_6$): δ (ppm)=11.54 (1H, bs), 9.81 (1H, s), 9.74 (1H, s), 7.97-7.95 (1H, m), 7.71-7.70 (1H, m), 7.53-7.51 (2H, m), 7.45-7.42 (1H, m), 7.37-7.34 (2H, m), 7.32-7.29 (1H, m), 7.13-7.09 (1H, m).

$^{13}$C-NMR (126 MHz, DMSO-d$_6$): δ (ppm)=151.47 (NHCONH), 151.47 (NHCONH), 149.66, 144.41, 142.92, 137.50, 128.88, 126.17, 126.05, 123.60, 123.44, 121.68, 119.50.

XXII, C$_{13}$H$_{12}$N$_4$O$_2$, M=256.3, 1-(2-pyridyl)-3-(phenylcarbamoyl)urea MS (ESI): m/z (%)=254.9 (100) [M–H]$^-$.

$^1$H-NMR (500 MHz, DMSO-d$_6$): δ (ppm)=10.07 (3H, bs), 8.31-8.30 (1H, m), 7.82-7.78 (1H, m), 7.76-7.75 (1H, m), 7.51-7.49 (2H, m), 7.35-7.32 (2H, m), 7.11-7.06 (2H, m).

$^{13}$C-NMR (126 MHz, DMSO-d$_6$): δ (ppm)=152.17, 151.50 (NHCONH), 151.35 (NHCONH), 147.54, 138.59, 137.73, 128.88, 123.40, 119.36, 118.98, 112.67.

XXIII, $C_{13}H_{12}N_4O_2$, M=256.3, 1-(4-pyridyl)-3-(phenylcarbamoyl)urea

MS (ESI): m/z (%)=255.1 (77) [M−H]⁻.

¹H-NMR (500 MHz, DMSO-d₆): δ (ppm)=10.05 (1H, s), 9.59 (1H, s), 9.25 (1H, s), 8.44-8.43 (2H, m), 7.50-7.48 (4H, m), 7.35-7.32 (2H, m), 7.10-7.07 (1H, m).

¹³C-NMR (126 MHz, DMSO-d₆): δ (ppm)=151.81 (NHCONH), 151.69 (NHCONH), 150.30, 144.78, 137.61, 128.85, 123.46, 119.39, 113.21.

XXIV, $C_{18}H_{17}N_3O$, M=339.3, 1-(4-acetylphenyl)-3-(4-acetylphenyl-carbamoyl)urea MS (ESI): m/z (%)=338.1 (100) [M−H]⁻.

¹H-NMR (500 MHz, DMSO-d₆): δ (ppm)=10.35-8.94 (3H, m), 7.94-7.92 (4H, m), 7.63-7.61 (4H, m), 2.52 (6H, s).

¹³C-NMR (126 MHz, DMSO-d₆): δ (ppm)=196.30 (COCH₃), 151.68 (NHCONH), 142.19, 131.81, 129.49, 118.39, 26.29 (CH₃).

XXV, $C_{23}H_{21}N_3O_6S$, M=467.5, 3-[(4-acetylphenylcarbamoyl)ureido]phenyl 4-tolylsulfonate MS (ESI): m/z (%)=466.1 (100) [M−H]⁻.

¹H-NMR (500 MHz, DMSO-d₆): δ (ppm)=10.04 (1H, s), 9.87 (1H, s), 9.30 (1H, s), 7.95-7.93 (2H, m), 7.77-7.75 (2H, m), 7.64-7.62 (2H, m), 7.48-7.47 (2H, m), 7.43-7.43 (2H, m), 7.31-7.30 (1H, m), 6.69-6.67 (1H, m), 2.53 (3H, s), 2.41 (3H, s).

¹³C-NMR (126 MHz, DMSO-d₆): δ (ppm)=196.31 (COCH₃), 151.68 (NHCONH), 151.63 (NHCONH), 149.26, 145.69, 142.22, 139.17, 131.80, 131.47, 130.13, 130.07, 129.50, 128.10, 118.38, 117.87, 116.39, 112.70, 26.31 (CH₃), 21.09 (CH₃).

XXVI, $C_{23}H_{21}N_3O_6S$, M=467.5, 4-tolyl 4-[(4-acetylphenylcarbamoyl)ureido]phenylsulfonate MS (ESI): m/z (%)=466.1 (100) [M−H]⁻.

¹H-NMR (500 MHz, DMSO-d₆): δ (ppm)=10.14 (1H, s), 9.93 (1H, s), 9.39 (1H, s), 7.95-7.93 (2H, m), 7.79-7.74 (4H, m), 7.64-7.62 (2H, m), 7.17-7.15 (2H, m), 6.91-6.88 (2H, m), 2.52 (3H, s), 2.25 (3H, s).

¹³C-NMR (126 MHz, DMSO-d₆): δ (ppm)=196.31 (COCH₃), 151.66 (NHCONH), 151.52 (NHCONH), 146.90, 143.57, 142.10, 136.76, 131.90, 130.21, 129.65, 129.50, 127.86, 121.70, 119.05, 118.46, 26.31 (CH₃), 20.25 (CH₃).

XXVII, $C_{22}H_{21}N_3O_6S$, M=455.5, 4-tolyl 4-[(4-methoxyphenylcarbamoyl)ureido]phenylsulfonate MS (ESI): m/z (%)=454.0 (100) [M−H]⁻.

¹H-NMR (500 MHz, DMSO-d₆): δ (ppm)=10.25 (1H, s), 9.40 (1H, s), 9.22 (1H, s), 7.79-7.73 (4H, m), 7.40-7.38 (2H, m), 7.17-7.15 (2H, m), 6.92-6.89 (4H, m), 3.73 (3H, s), 2.26 (3H, s).

¹³C-NMR (126 MHz, DMSO-d₆): δ (ppm)=155.59, 151.80 (NHCONH), 151.78 (NHCONH), 146.89, 143.71, 136.72, 130.47, 130.19, 129.63, 127.66, 121.66, 121.27, 118.90, 114.05, 55.15 (OCH₃), 20.23 (CH₃).

XXVIII, $C_{21}H_{18}ClN_3O_5S$, M=459.9, 4-tolyl 4-[(3-chlorophenylcarbamoyl)ureido]phenylsulfonate MS (ESI): m/z (%)=458.0 (100) [M−H]⁻.

¹H-NMR (500 MHz, DMSO-d₆): δ (ppm)=10.27 (1H, s), 9.87 (1H, s), 9.43 (1H, s), 7.79-7.74 (5H, m), 7.35-7.34 (2H, m), 7.17-7.15 (2H, m), 7.13-7.11 (1H, m), 6.90-6.88 (2H, m), 2.25 (3H, s).

¹³C-NMR (126 MHz, DMSO-d₆): δ (ppm)=151.67 (NHCONH), 151.65 (NHCONH), 146.88, 143.62, 139.18, 136.71, 133.23, 130.41, 130.18, 129.61, 127.79, 123.10, 121.66, 118.96, 118.83, 117.82, 20.23 (CH₃).

XXIX, $C_{22}H_{20}N_6O_4$, M=432.4, N,N'-1,4-phenylene-bis[N''-phenylcarbamoylurea]

MS (ESI): m/z (%)=431.1 (100) [M−H]⁻.

¹H-NMR (500 MHz, DMSO-d₆): δ (ppm)=9.70 (2H, s), 9.65 (2H, s), 9.03 (2H, s), 7.50-7.46 (8H, m), 7.34-7.31 (4H, m), 7.09-7.06 (2H, m).

¹³C-NMR (126 MHz, DMSO-d₆): δ (ppm)=151.92 (NHCONH), 137.82, 133.37, 128.84, 123.25, 119.98, 119.23.

The heat-sensitive recording materials according to the invention were produced as follows, with non-phenolic colour developers of the prior art being used as comparison colour developers, namely N-(2-(3-phenylureido)phenyl) benzenesulfonamide (comparison example Vb) and a sulfonylurea, Pergafast® 201, BASF (PF201) (comparison example PF201):

An aqueous coating suspension was applied to one side of a 63 g/m² synthetic base paper (Yupo® FP680) using a doctor blade on a laboratory scale to form the heat-sensitive colour-forming layer of a heat-sensitive recording paper. After drying, a thermal recording sheet was obtained. The application rate of the heat-sensitive colour-forming layer was between 3.8 and 4.2 g/m².

On the basis of the above information, a heat-sensitive recording material or thermal paper was produced, with the following formulations of aqueous application suspensions being used to form a composite structure on a carrier substrate, and then the other layers, especially a protective layer, being formed in the usual manner, which will not be discussed separately here.

Production of the dispersions (in each case for 1 part by weight) for the application suspensions:

The aqueous dispersion A (colour former dispersion) is produced by grinding 20 parts by weight of 3-N-n-dibutylamino-6-methyl-7-anilinofluoran (ODB-2) with 33 parts by weight of a 15% aqueous solution of Ghosenex™ L-3266 (sulfonated polyvinyl alcohol, Nippon Ghosei) in a bead mill.

The aqueous dispersion B (colour developer dispersion) is produced by grinding 40 parts by weight of the colour developer together with 66 parts by weight of a 15% aqueous solution of Ghosenex™ L-3266 in a bead mill.

The aqueous dispersion C (sensitising agent dispersion) is produced by grinding 40 parts by weight of sensitising agent with 33 parts by weight of a 15% aqueous solution of Ghosenex™ L-3266 in a bead mill.

All dispersions produced by grinding have an average particle size $D_{(4.3)}$ of 0.80-1.20 μm. The particle size distribution of the dispersions was measured by laser diffraction using a Coulter LS230 instrument from Beckman Coulter.

Dispersion D (lubricant dispersion) is a 20% zinc stearate dispersion consisting of 9 parts by weight of Zn-stearate, 1 part by weight of Ghosenex™ L-3266, and 40 parts by weight of water.

Pigment P is a 72 coating kaolin suspension (Lustra® S, BASF).

The binder consists of a 10 aqueous polyvinyl alcohol solution (Mowiol 28-99, Kuraray Europe).

The heat-sensitive application suspension is produced by mixing, with stirring, 1 part of dispersion A, 1 part of dispersion B, 1 part of dispersion C, 56 parts of dispersion D, 146 parts of pigment P and 138 parts of binder solution (all parts by weight), taking into account the order of introduction B, C, D, P, A, binder, and bringing the mixture to a solids content of about 25% with water.

The heat-sensitive coating suspensions obtained in this way were used to produce composite structures consisting of paper carrier and heat-sensitive colour-forming layer.

The heat-sensitive recording materials according to the invention were evaluated as shown below (Tables 3 and 4)

(1) Dynamic Colour Density:

The papers (6 cm wide strips) were thermally printed with a chessboard pattern with 10 energy levels using an Atlantek 200 test printer (Atlantek, USA) with a Kyocera print bar of 200 dpi and 560 ohms at an applied voltage of 20.6 V and a maximum pulse width of 0.8 ms. The image density (optical density, o. d.) was measured with a SpectroEye densitometer from X-Rite at an energy level of 0.45 mJ/dot. The measurement uncertainty of the o. d. values is estimated at ≤2%.

(2) Static Colour Density (Starting Temperature):

The recording sheet was pressed against a series of thermostatically controlled metallic stamps heated to different temperatures with a contact pressure of 0.2 kg/cm² and a contact time of 5 seconds (thermal tester TP 3000QM, Maschinenfabrik Hans Rychiger AG, Steffisburg, Switzerland). The image density (opt. density) of the images thus produced was measured with a SpectroEye densitometer from X-Rite.

The static starting point is, by definition, the lowest temperature at which an optical density of 0.2 is achieved. The accuracy of the measuring method is ≤±0.5° C.

(3) Resistance Test of the Printed Image Under Artificial Ageing Conditions:

Samples of the thermal recording paper dynamically recorded according to the process of (1) were stored for 7 days under one each of the following conditions:

i) 50° C. (dry ageing),
ii) 40° C., 85% relative humidity (humidity ageing) and
iii) under artificial light from fluorescent tubes, illuminance 16000 lux (light ageing).

At the end of the test period, the image density was measured at a current energy of 0.45 mJ/dot and set in relation to the corresponding image density values before artificial ageing in accordance with the formula (Eq. 1).

$$\% \text{ remaining image density} = \left(\frac{\text{image density after test}}{\text{image density before test}}\right) * 100 \quad \text{(Eq. 1)}$$

The spread of the % values calculated according to (Eq. 1) is ≤±2 percentage points.

(4) Shelf Life of the Unprinted Thermal Paper:

A sheet of recording paper was cut into three identical strips. One strip was dynamically recorded according to the process of (1) and the image density was determined. The other two strips were stored in the unprinted (white) state for 4 weeks in a climate of a) 40° C. and 85% relative humidity (r. h.) and b) 60° C. and 50% relative humidity (r. h.).

After conditioning the papers at room temperature, they were dynamically printed according to the process of (1) and the image density was determined using a densitometer at a current energy of 0.45 mJ/dot. The remaining writing power (%) of the stored to fresh (not aged) samples was calculated according to equation (Eq. 1).

Tables 3 and 4 summarise the evaluation of the heat-sensitive recording materials produced.

TABLE 3

Image density, starting temperature and artificial ageing;

| Colour developer | o.d. (0.45 mJ/dot) | Starting point (° C.) | Artificial ageing* | | |
|---|---|---|---|---|---|
| | | | dry | moist | light |
| VII | 1.28 | 86 | 100 | 98 | 84 |
| XXV | 1.22 | 89 | 100 | 97 | 71 |
| XXVI | 1.23 | 84 | 100 | 98 | 77 |
| XXVIII | 1.24 | 90 | 100 | 99 | 74 |
| Comparison example Vb | 1.24 | 82 | 98 | 98 | 76 |
| Comparison example PF201 | 1.22 | 78 | 98 | 97 | 73 |

*remaining % image density (o.d.), (according to Eq. 1)

TABLE 4

Writing performance after storage;

| | | 4 weeks 40° C./85% r.h. | | 4 weeks 60° C./50% r.h. | |
|---|---|---|---|---|---|
| Colour developer | o.d. before storage | o.d. after storage | Remaining o.d. (%)* | o.d. after storage | Remaining o.d. (%)* |
| VIII | 1.28 | 1.26 | 98.4 | 1.14 | 89.1 |
| XXV | 1.22 | 1.20 | 98.4 | 1.11 | 91.0 |
| XXVI | 1.23 | 1.20 | 97.6 | 1.10 | 89.4 |
| XXVIII | 1.24 | 1.27 | 102.4 | 1.10 | 88.7 |
| Comparison example Vb | 1.24 | 1.26 | 101.6 | 1.04 | 83.9 |
| Comparison example PF201 | 1.22 | 1.20 | 98.4 | 0.81 | 66.4 |

*according to Eq. 1

The heat-sensitive recording material according to the invention shows the following advantageous properties especially:

(1) The recorded image of the heat-sensitive recording materials according to the invention with the colour developers (A) has a print density (optical density) comparable to that of the colour developers of the comparison samples (Table 3).

(2) The temperature from which a visually perceptible greying of the heat-sensitive recording materials according to the invention occurs (static starting point) is higher than that of the comparison papers and largely meets the requirements for marketable heat-sensitive recording materials (Table 3).

(3) The heat-sensitive recording materials subjected to the ageing test reveal a high image stability, better or comparable to the comparison papers (Table 3).

(4) Printing on the heat-sensitive recording materials according to the invention stored for several weeks under extreme conditions results in image densities that are practically identical to those of unstored (fresh) heat-sensitive recording materials (Table 4).

(5) With the colour developers of formula (A), a heat-sensitive recording material of high quality in all of the important application-related aspects can be obtained, and no thermal paper obtained with prior-art colour developers has a comparable good performance profile with regard to all properties.

The invention claimed is:

1. Heat-sensitive recording material comprising a carrier substrate and a heat-sensitive colour-forming layer, which contains at least one colour former and at least one phenol-free colour developer, characterised in that the at least one colour developer is the compound of formula (A)

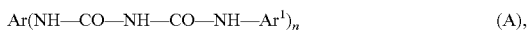

Ar(NH—CO—NH—CO—NH—Ar¹)ₙ       (A), wherein Ar is an unsubstituted or substituted phenyl or naphthyl group, Ar¹ is an unsubstituted or substituted phenyl, naphthyl, pyridyl, thiazolyl or benzothiazolyl group, and n is 1 or 2.

2. Heat-sensitive recording material according to claim 1, characterised in that n is 1.

3. Heat-sensitive recording material according to claim 1, characterised in that Ar is a phenyl group substituted with a $C_1$-$C_4$ alkyl group, an alkenyl group, an alkynyl group, a benzyl group, a halogen group, an $NO_2$ group, a CN group, a formyl group, an ROC group, an RO group, an $RO_2C$ group, an ROCO group, an R—$SO_2$O group, an RO—$SO_2$ group, an RNHCO group, an RCONH group, an R—NH—$SO_2$ group, or an R—$SO_2$—NH group, wherein R is a $C_1$-$C_4$ alkyl group, an alkenyl group, an alkynyl group, a phenyl group, a tolyl group, or a benzyl group.

4. Heat-sensitive recording material according to claim 1, characterised in that Ar is an unsubstituted phenyl group, a 4-acetyl-phenyl group, a 3-chloro-phenyl group, or a 4-methoxy-phenyl group.

5. Heat-sensitive recording material according to claim 1, characterised in that Ar¹ is a phenyl group substituted with a $C_1$-$C_4$ alkyl group, an alkenyl group, an alkynyl group, a benzyl group, a halogen group, an $NO_2$ group, a CN group, a formyl group, an R¹OC group, an R¹O group, an $R^1O_2C$ group, an R¹OCO group, an R¹—$SO_2$O group, an R¹O—$SO_2$ group, an R¹NHCO group, an R¹CONH group, an R¹—NH—$SO_2$ group, or an R¹—$SO_2$—NH group, wherein R¹ is a $C_1$-$C_4$ alkyl group, an alkenyl group, an alkynyl group, a phenyl group, a tolyl group, a benzyl group, a thiazolyl group, a benzothiazolyl group, or a pyrimidyl group.

6. Heat-sensitive recording material according to claim 1, characterised in that Ar¹ is a phenyl group substituted in the 3- or 4-position with an R¹O—$SO_2$ group or an R¹—$SO_2$O group.

7. Heat-sensitive recording material according to claim 1, characterised in that the carrier substrate is paper, synthetic paper and/or a plastics film.

8. Heat-sensitive recording material according to claim 1, characterised in that the at least one colour former is a dye of the triphenylmethane type, of the fluoran type, of the azaphthalide type and/or of the fluorene type.

9. Heat-sensitive recording material according to claim 1, characterised in that the compound of formula (A) is present in an amount of from about 3 to about 35% by weight in relation to the total solids content of the heat-sensitive layer.

10. Heat-sensitive recording material according to claim 1, characterised in that the heat-sensitive colour-forming layer comprises at least one sensitising agent.

11. Heat-sensitive recording material according to claim 1, characterised in that the heat-sensitive colour-forming layer contains additives selected from stabilisers, binders, release agents, pigments and/or brighteners.

12. Heat-sensitive recording material according to claim 1, characterised in that the applied weight per unit area of the (dry) heat-sensitive layer is about 1 to about 10 g/m².

13. Heat-sensitive recording material according to claim 1, characterised in that the dried heat-sensitive colour-forming layer is subjected to a smoothing measure in such a way that it has a Bekk smoothness, measured according to ISO 5627: 1995, of from about 100 to about 1000 sec.

14. Heat-sensitive recording material according to claim 1, characterised in that at least one further intermediate layer is present between the carrier substrate and the heat-sensitive colour-forming layer.

15. Method for producing a heat-sensitive recording material according to claim 1, wherein an aqueous suspension containing the starting materials of the heat-sensitive colour-forming layer is applied to a carrier substrate and dried, the aqueous application suspension having a solids content of from about 20 to about 75% by weight, and being applied and dried by the curtain coating process at an operating speed of the coating plant of at least about 400 m/min.

16. Heat-sensitive recording material obtainable by the process according to claim 15.

17. A method of thermal printing comprising thermally printing upon a paper including the heat-sensitive recording material of claim 1.

18. Heat-sensitive recording material according to claim 1, characterised in that that at least one colour former is a dye of the fluoran type and the applied weight per unit area of the (dry) heat-sensitive layer is about 3 to about 6 g/m² and the compound of formula (A) is present in an amount from about 10 to about 25% by weight.

19. Heat-sensitive recording material according to claim 14, characterised in that the at least one further intermediate layer contains organic hollow sphere pigments and/or calcined kaolins.

20. Method for producing a heat-sensitive recording material according to claim 1, wherein an aqueous suspension containing the starting materials of the heat-sensitive colour-forming layer is applied to a carrier substrate and dried, the aqueous application suspension having a solids content of from about 30 to about 50% by weight, and being applied and dried by a curtain coating process at an operating speed of a coating plant of at least about 1500 m/min.

* * * * *